United States Patent [19]

Suzuki

[11] Patent Number: 5,884,077
[45] Date of Patent: *Mar. 16, 1999

[54] INFORMATION PROCESSING SYSTEM AND METHOD IN WHICH COMPUTER WITH HIGH LOAD BORROWS PROCESSOR OF COMPUTER WITH LOW LOAD TO EXECUTE PROCESS

[75] Inventor: Shigeo Suzuki, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 520,586

[22] Filed: Aug. 30, 1995

[30] Foreign Application Priority Data

Aug. 31, 1994 [JP] Japan .................................. 6-207205
Sep. 12, 1994 [JP] Japan .................................. 6-217160

[51] Int. Cl.$^6$ ..................................................... G06F 13/00
[52] U.S. Cl. .......................... 395/675; 395/674; 395/673
[58] Field of Search .................................. 395/672, 673, 395/674, 675

[56] References Cited

U.S. PATENT DOCUMENTS 5,692,192  11/1997  Sudo ...................................... 395/675

OTHER PUBLICATIONS

"Dynamic Load Balancing in a Distributed System Using a Sender–Initiated Algorithm". Anna Hac et al. Local Computer Network, 1988 13th Conference.

"Load Distributing for Locally Distributed Systems", Shivaratri et al. Computer, 1992.

"A Task Migration Algorithm for Load Balancing in a Distritubed System", Jea–cheol Ryou et al, System Sciences, 1989 Annual Hawaii Conference.

"A Dynamic Load Balancing Policy with a Central Job Dispatcher" Hwa–chun–Lin et al, Distributed Computing systems, 1991 International Conference.

"Dynamic Load Balancing in a Cluster of Loosely Coupled Systems", IBM Technical Disclosure Bulletin vol. 37, No. 07, Jul. 1994.

"Single System Image and Load Balancing for Network Access to a Loosely Coupled Complex", IBM Technical Disclosure Bulletin, vol. 34, No. 9, Feb. 1992.

Malkawi et al, Process Migration in Virtual Memory Multicomputer Systems, System Sciences, 1993 Annual Hawaii Int'l Conf. VII pp. 90–95, 5–8 Jan. 93.

*Primary Examiner*—Lucien U. Toplu
*Assistant Examiner*—Alice Park
*Attorney, Agent, or Firm*—Fitzpatrick, Cella, Harper & Scinto

[57] ABSTRACT

A method and system are disclosed in which, when the load of a processor in a given computer is high, a processor is borrowed from another computer. The computer from which the processor is borrowed is selected based on an acquired load state of the other computer, and a processor lending request is issued to the selected computer. The computer which received the processor lending request selects a processor for lending, and causes the selected processor to execute a process of the computer which issued the lending request. This distributes the load on the processor by utilizing the processor resources of other computers.

17 Claims, 7 Drawing Sheets

INFORMATION PROCESSING SYSTEM AND METHOD IN WHICH COMPUTER WITH HIGH LOAD BORROWS PROCESSOR OF COMPUTER WITH LOW LOAD TO EXECUTE PROCESS

BACKGROUND OF THE INVENTION

1. Field of the Invention

The present invention relates to an information processing system and method, in which a plurality of computers are connected via a high-speed communication line, memories (or their portions) arranged in the respective computers constitute a single memory space as a whole, and the entire system can operate in the form of an NUMA (Non Uniform Memory Access) type multi-processor system (in the form that although an access to a memory arranged in a subject computer is made at high speed and an access to memories arranged in other computers is made at low speed when viewed from a given computer, since these memories form a single memory space as a whole, the computers can also be used as a multi-processor system).

2. Related Background Art

Conventionally, in a computer system in which computers are connected via a low-speed communication line such as a LAN (Local Area Network), when a program is executed in large amount on a subject computer, and the processor in the subject computer becomes busy, an OS (operating system) having a process migration function can migrate the process in execution to another computer connected via the communication line, thus effectively utilizing the processor on the other computer.

However, in the case of the process migration function, in order to migrate and re-execute a process, the memory contents (text, data, or stack) required for executing the process, the process management table in the OS, and the like must be transferred to the memory on the computer as the migration destination, resulting in a large overhead.

In migrating and re-executing a process, the following limitations are often imposed. That is, 1. Migration can only be made upon generation of a process.
2. The parent/child relationship of the migrated process cannot be maintained.
3. The migrated process cannot generate a new child process.

This is because it is very hard to maintain consistency between process management information in the destination OS and that in the source OS.

Conventionally, in a computer system in which a plurality of computers are connected via a low-speed communication line such as a LAN, upon generation and start of a user program as a process, if the physical memory on a computer which is to generate the process is insufficient, the OS having a virtual memory function performs a page-out operation of the contents of physical pages with a low use ratio to a secondary memory device of the subject computer or another computer.

In this case, even when the physical memory on the other computer connected via the communication line has a sufficient memory space, the physical memory cannot be directly utilized. This is because no hardware arrangement which can directly disclose the physical memory of another computer can be adopted due to the low-speed communication line.

However, in recent years, the advent of communication media such as an optical cable, which has high reliability and performance relatively close to that of the internal bus of a computer allows to adopt an arrangement which can directly disclose the physical memory to another computer. Thus, a system in which memories (or their portions) arranged in computers constitute a single memory space and the memory space can be directly accessed by any computer is proposed. In this system, if a memory on another computer has a sufficient memory space, it can be assured or secured and directly utilized without executing the above-mentioned page-out operation.

However, when the physical memory on the computer which is to generate a process is insufficient, if physical pages are secured without rules from a plurality of computers upon securing of pages from another computer, memory pages required for executing the process are distributed to a plurality of computers. If execution of the process proceeds in such a state, the processing efficiency of the system is impaired.

This is because if the processor on which the process runs and the physical memory to be used are present on the same computer, a high processing speed of the process can be secured due to a high-speed memory access. However, if the processor and the physical memory are present on different computers connected via the communication line, the processing speed of the process becomes low due to a low-speed memory access.

In order to solve the above-mentioned problems, the present applicant has proposed a computer system in U.S. Ser. No. 334,373 filed previously. In this system, when a process is generated and started, and secures physical pages, if no more pages cannot be secured on the computer on which the process is running, the remaining pages are secured from a single computer as much as possible in place of randomly securing the pages from a plurality of computers. It is then checked which is more efficient to execute the process on the subject computer or on another computer. If it is determined that the process is to be executed on the other computer to obtain high efficiency, the OS of the source computer migrates context information required for executing the process to the computer which is determined to assure high efficiency, and the destination computer proceeds with execution of the process, thereby improving the processing efficiency of the process.

However, in the case of the process migration technique for migrating the context information to proceed with the execution of the process, when the process migrates, limitations which are not imposed in normal processes are imposed. For example, the parent/child relationship of processes cannot be maintained, the migrated process cannot generate a new child process. This is because it is very hard to maintain consistency between process management information in the destination OS and that in the source OS.

Although the memory contents (program, data, or stack) need not be transferred, the context information (the register values of a processor, the allocation information of a page memory in use, and the like) must be migrated, and depending on the transfer amount of context information, the load on the communication line, and the load on the transfer processing of the processor pose other problems.

SUMMARY OF THE INVENTION

It is an objective of the present invention to provide an information processing method and apparatus which can efficiently utilize resources of processors on other computers connected via a communication line with a minimum overhead upon generation, execution, and control of a process without suffering any inconvenient limitations.

It is another objective of the present invention to provide a computer system in which a technique for transferring control itself of a processor is utilized, it is determined which is more efficient to execute the process of interest by the current processor or by transferring the control of a processor of another computer, and if it is determined that it is more efficient to execute the process by transferring the control of the processor of the other computer, the control of the processor of the computer which can assure higher efficiency is transferred and assigned to execution of the process, thereby improving the process execution efficiency.

According to one aspect, the present invention which achieves these objectives relates to an information processing apparatus comprising: at least one processor; processor load state detection means for detecting a processing load state of the processor; other processor load state acquisition means for acquiring a processing load state of a processor of another information processing apparatus; determination means for determining on the basis of the processing load state detected by the processor load state detection means if the processor is to be borrowed from the other information processing apparatus; information processing apparatus selection means for, when the determination means determines that the processor is to be borrowed, selecting the other information processing apparatus from which the processor is to be borrowed, on the basis of the processing load state on the processor of the other information processing apparatus acquired by the other processor load state acquisition means; and processor lending request means for requesting a loan of the processor to the information processing apparatus selected by the information processing apparatus selection means.

According to another aspect, the present invention which achieves these objectives relates to an information processing apparatus comprising: at least one processor; selection means for selecting a processor for rent from the processor on the basis of a processor lending request from another information processing apparatus; process assignment means for assigning a current process of or a process scheduled to be executed by the processor selected by the selection means to another processor; and other process execution means for causing the processor selected by the selection means to access and execute a program stored in predetermined memory means in the other information processing apparatus.

According to another aspect, the present invention which achieves these objectives relates to a system comprising a plurality of information processing apparatuses each having at least one processor, wherein each of the plurality of information processing apparatuses comprises: processor load state detection means for detecting a processing load state of the processor in the subject apparatus; determination means for determining on the basis of the processing load state of the processor detected by the processor load state detection means if a processor is to be borrowed from another information processing apparatus; other processor load state acquisition means for acquiring a processing load state in another information processing apparatus; information processing apparatus selection means for, when the determination means determines that the processor is to be borrowed from the other information processing apparatus, selecting one information processing apparatus from which the processor is to be borrowed, on the basis of the processing load state of the processor of the other information processing apparatus acquired by the other processor load state acquisition means; processor lending request means for requesting a loan of the processor to the information processing apparatus selected by the information processing apparatus selection means; lending processor selection means for selecting a processor for rent on the basis of a processor lending request from another information processing apparatus; and other process execution means for causing the processor selected by the lending processor selection means to access and execute a program stored in predetermined memory means of the other information processing apparatus.

According to another aspect, the present invention which achieves these objectives relates to an information processing method for an information processing apparatus having at least one processor, comprising: the processor load state detection step of detecting a processing load state of the processor; the other processor load state acquisition step of acquiring a processing load state of a processor of another information processing apparatus; the determination step of determining on the basis of the processing load state detected in the processor load state detection step if the processor is to be borrowed from the other information processing apparatus; the information processing apparatus selection step of selecting the other information processing apparatus from which the processor is to be borrowed, on the basis of the processing load state on the processor of the other information processing apparatus acquired in the other processor load state acquisition step when it is determined in the determination step that the processor is to be borrowed; and the processor lending request step of requesting a loan of the processor to the information processing apparatus selected by the information processing apparatus selection means.

According to another aspect, the present invention which achieves these objectives relates to an information processing method for an information processing apparatus having at least one processor, comprising: the selection step of selecting a processor for rent from the processor on the basis of a processor lending request from another information processing apparatus; the process assignment step of assigning a current process of or a process scheduled to be executed by the processor selected in the selection step to another processor; and the other process execution step of causing the processor selected in the selection step to access and execute a program stored in a predetermined memory in the other information processing apparatus.

According to another aspect, the present invention which achieves these objectives relates to an information processing method using a plurality of information processing apparatuses each having at least one processor, comprising: the processor load state detection step of causing each information processing apparatus to detect a processing load state of the processor in the subject apparatus; the determination step of causing each information processing apparatus to determine on the basis of the processing load state of the processor detected in the processor load state detection step if a processor is to be borrowed from another information processing apparatus; the other processor load state acquisition step of causing each information processing apparatus to acquire a processing load state in another information processing apparatus detected in the processor load state detection step; the information processing apparatus selection step of selecting one information processing apparatus from which the processor is to be borrowed, on the basis of the processing load state of the processor of the other information processing apparatus acquired in the other processor load state acquisition step when it is determined in the determination step that the processor is to be borrowed from the other information processing apparatus; the processor lending request step of requesting a loan of the processor to the information processing apparatus selected in the information processing apparatus selection step; the lending processor selection step of selecting a processor for rent from the selected information processing apparatus on the basis of the processor lending request in the lending processor selection step; and the other process execution step of causing the processor selected in the lending processor selection step to access and execute a program stored in a predetermined memory of the other information processing apparatus.

According to another aspect, the present invention which achieves these objectives relates to an information processing apparatus which is connected to at least one another information processing apparatus having an independent memory via a communication line, comprising: information acquisition means for acquiring control information of a physical memory and scheduling information of process execution of the other information processing apparatus; assignment page determination means for determining an information processing apparatus from a physical memory of which a physical page to be assigned to a process to be executed is secured, on the basis of the information acquired by the information acquisition means; remote page securing means for securing a remote page from the information processing apparatus determined by the assignment page determination means and having the physical page; processor migration decision means for determining if control of a processor of the other information processing apparatus is to be transferred to control of the subject apparatus and the processor is assigned to the process to be executed upon proceeding with execution of the process; and processor migration assignment means for, when the processor migration decision means determines that the process is to be executed by the transferred processor, transferring the control of the processor from the transferor information processing apparatus and assigning the processor to execute the process.

According to another aspect, the present invention which achieves these objectives relates to an information processing method for an information processing apparatus which is connected to at least one other information processing apparatus having an independent memory via a communication line, comprising: the information acquisition step of acquiring control information of a physical memory and scheduling information of process execution of the other information processing apparatus; the assignment page determination step of determining an information processing apparatus from a physical memory of which a physical page to be assigned to a process to be executed is secured, on the basis of the information acquired in the information acquisition step; the remote page securing step of securing a remote page from the information processing apparatus determined in the assignment page determination step and having the physical page; the processor migration decision step of determining if control of a processor of the other information processing apparatus is to be transferred to control of the subject apparatus and the processor is assigned to the process to be executed upon proceeding with execution of the process; and the processor migration assignment step of transferring the control of the processor from the transferor information processing apparatus and assigning the processor to execute the process when it is determined in the processor migration decision step that the process is to be executed by the transferred processor.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiment of the present invention will be described in detail hereinafter with reference to the accompanying drawings.

The technical background which relates to an embodiment of the present invention will be briefly described below.

In recent years, the advent of communication media such as an optical cable, which has high reliability and performance relatively close to that of the internal bus of a computer allows to adopt an arrangement which can use a physical memory from another computer. Thus, a system in which memories (or their portions) arranged in computers constitute a single memory space and the memory space can be directly accessed by any computer is proposed.

In this system, it may be possible to utilize a processor on another computer in the same manner as the processor on the subject computer, i.e., in an environment in which the number of processors of the subject computer increases, by directly transferring the processor on the other computer under the control of an OS of the subject computer in place of utilizing the processor on the other computer by migrating a process unlike in the above-mentioned process migration function.

In consideration of the above situation, an information processing apparatus according to an embodiment of the present invention comprises the following arrangement. That is, the apparatus comprises a processor load detection state for detecting the load state of a processor under the control of a computer, an other computer information collection unit for collecting load information of another computer connected via a communication line, a creditor computer selection unit for selecting a creditor computer of a processor, a processor lending request unit for requesting a loan of processors in correspondence with the number of processors determined by the creditor computer selection unit, a processor lending unit for lending a requested number of processors, a processor reception unit for receiving the lent processors and setting them under the control of the computer, and a processor return unit for returning the borrowed processors to the creditor computer.

The embodiment of the present invention will be described in detail below with reference to the accompanying drawings.

Figure 1:
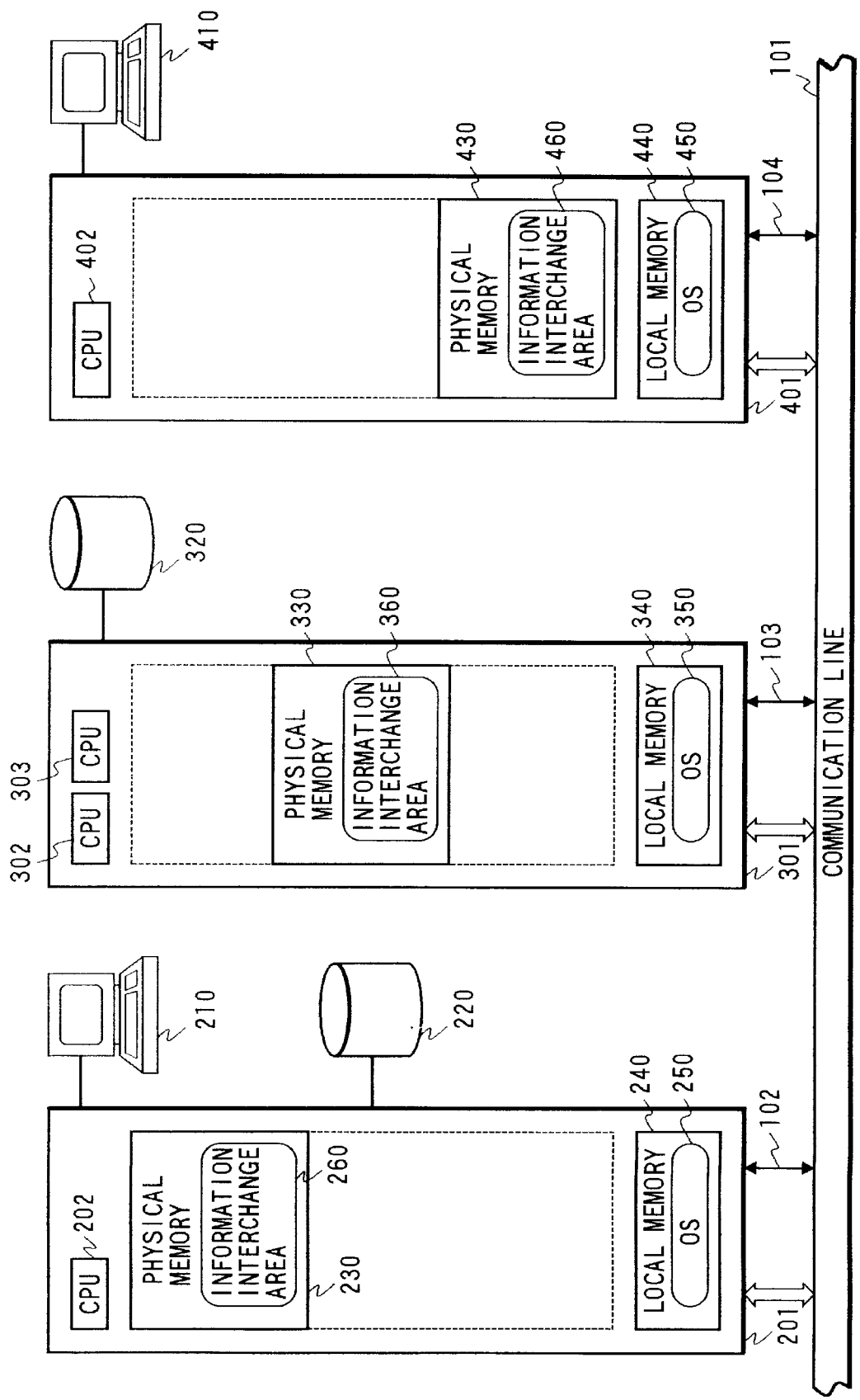
FIG. 1 is a block diagram showing an information processing system according to an embodiment of the present invention.

FIG. 1 shows the schematic arrangement of the information processing system according to the present invention. In this system, computers 201, 301, and 401 are connected via a high-speed communication line 101 such as an optical network. The computers 201, 301, and 401 respectively comprise one or more MMU (Memory Management Unit) built-in processors 202, 302, 303, and 402. The computers 201 and 401 respectively comprise display & keyboard units 210 and 410 serving as user interfaces. The computers 201 and 301 respectively comprise secondary memory devices 220 and 320 such as hard disk devices.

Note that the computers need not always comprise the display & keyboard units or the secondary memory device. For example, the computer 301 with no display & keyboard unit can be utilized as a server machine or a processor pool.

Inter-CPU interrupt lines 102, 103, and 104 are used for performing asynchronous communications among OSs which run on the respective computers.

Physical memories 230, 330, and 430 constitute a single memory space as a whole, and local memories 240, 340, and 440 are used by the respective computers.

Note that the local memories are mainly required for processing of the OS, but may be omitted since portions of the physical memories 230, 330, and 430 can be used instead.

The processors 202, 302, 303, 402, and 403 can access the physical memories 230, 330, and 430. In this case, an access to a physical memory belonging to another computer is performed at a lower speed than that of an access to a physical memory in a computer in which the processor which makes the memory access is present due to the presence of the communication line 101.

OSs (operating systems) 250, 350, and 450 respectively run on the computers 201, 301, and 401. These OSs have substantially the same functions, and respectively run on the computers 201, 301, and 401 to cooperate with each other. Thus, independence of each computer can be maintained, and the flexibility of the system as a whole can be improved as well.

In this embodiment, the OSs 250, 350, and 450 perform scheduling of a plurality of processors, virtual memory control, and the like, and recognize system information indicating the physical addresses of the physical memory on each computer, as a matter of course. Such OSs having substantially the same functions run on the respective computers to cooperate with each other. Thus, independence of each computer can be maintained, and the flexibility of the system as a whole can be improved.

The OSs may run on either the local memories 240, 340, and 440 on the computers or the physical memories 230, 330, and 430.

Note that portions of data areas of the OSs are allocated on information interchange areas 260, 360, and 460 on the physical memories 230, 330, and 430 to interchange information of the memories controlled by the OSs, process scheduling information, and the like.

Each OS can load a user program not only from the secondary memory device of the subject computer but also from the secondary memory device of another computer via the communication line 101.

Figure 5:
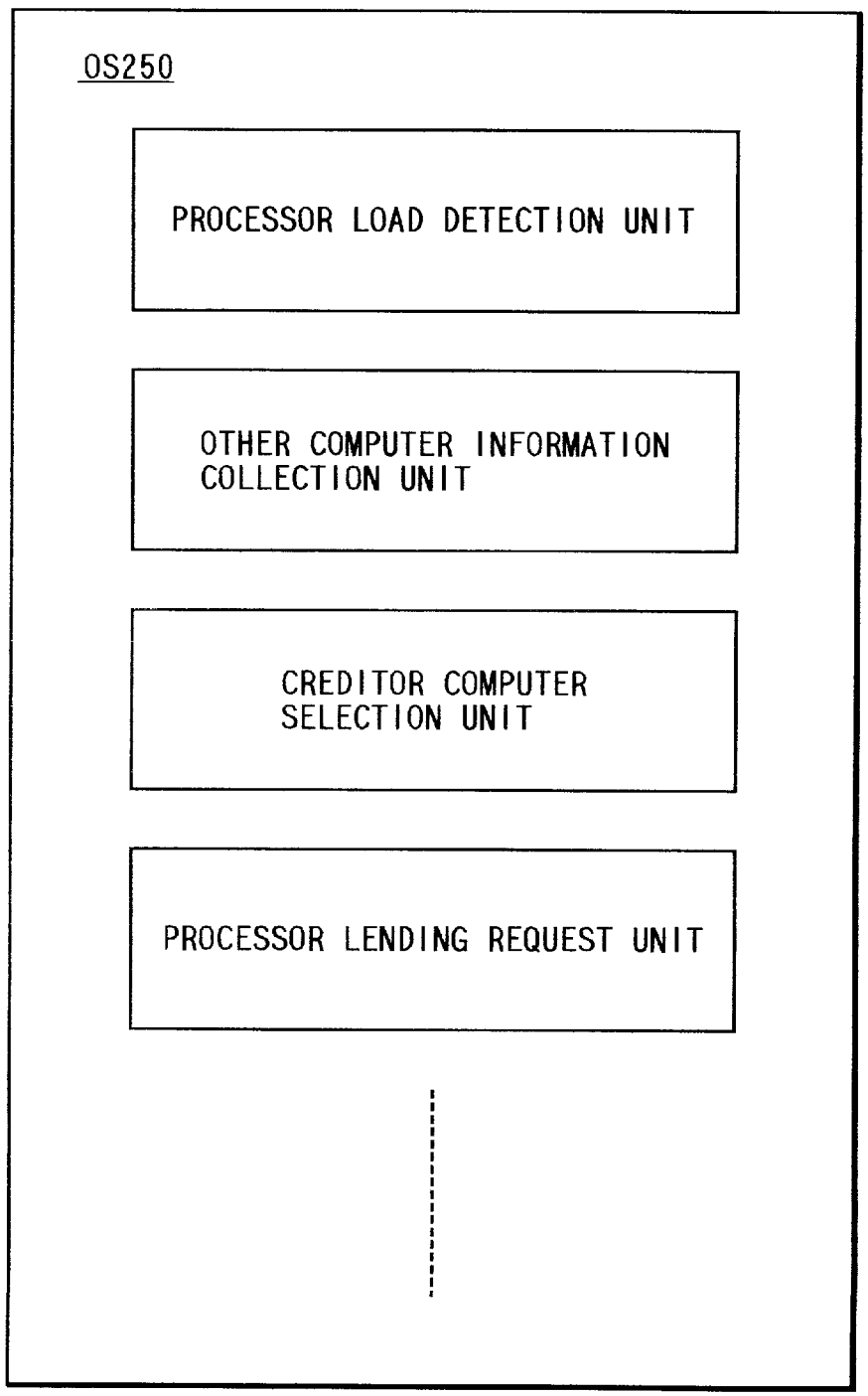
FIG. 5 is a schematic view showing the principal functions of an OS in the embodiment shown in FIG. 1.

FIG. 5 schematically shows elementary processing units of each OS (e.g., the OS 250) in this embodiment. Each OS comprises a processor load detection unit, an other computer information collection unit, a creditor computer selection unit, a processor lending request unit, and the like.

Note that the OSs may run on either the local memories 240, 340, and 440 on the computers or the physical memories 230, 330, and 430. Note that portions of data areas of the OSs are allocated on the physical memories 230, 330, and 430 to interchange load information of the processors controlled by the OSs, and the like. In this case, the information interchange areas 260, 360, and 460 are allocated on the physical memories 230, 330, and 430. On the other hand, the inter-computer interrupt lines 202, 302, and 402 are used for performing asynchronous communications among OSs which run on the respective computers.

Figure 2:
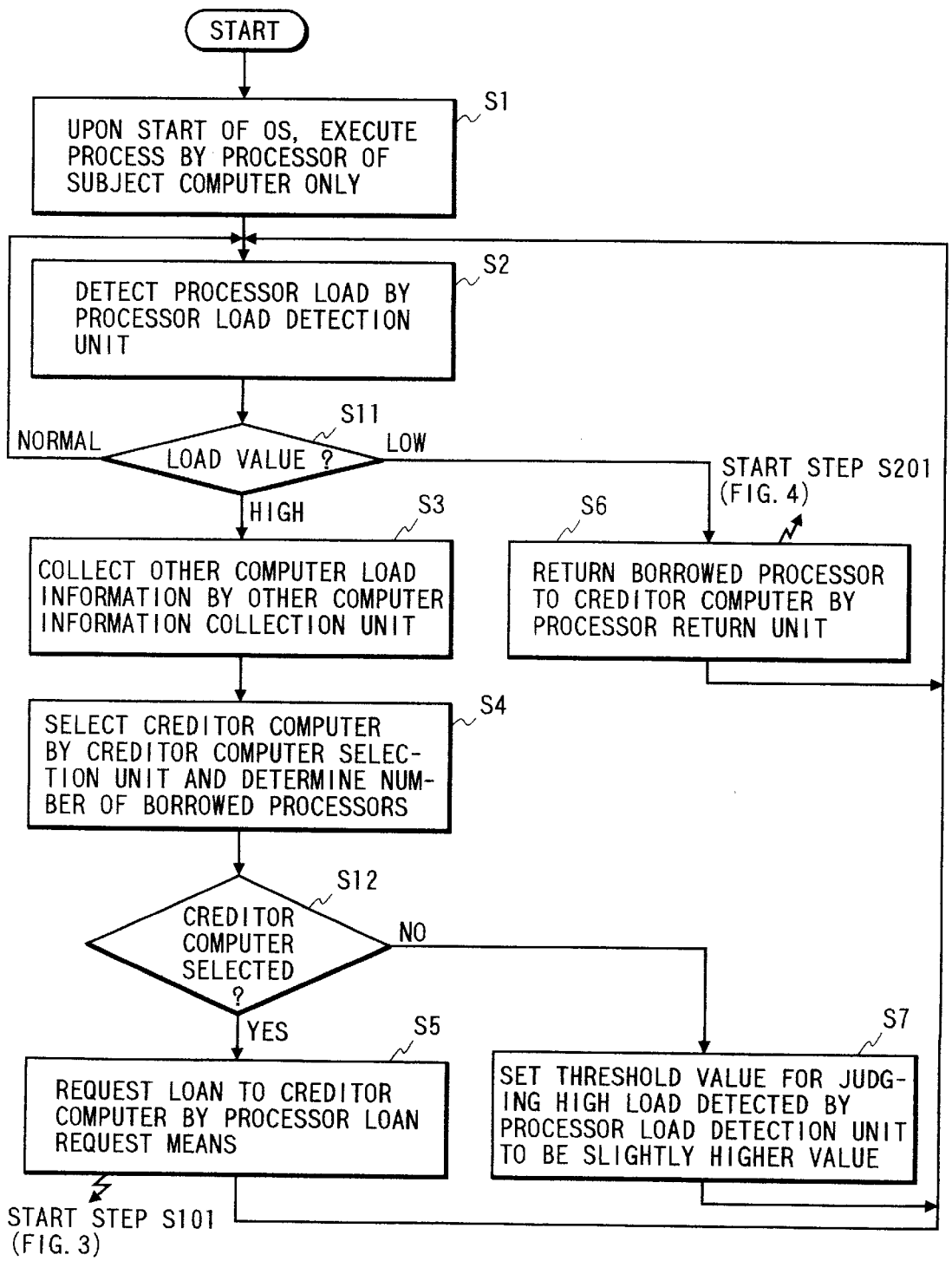
FIG. 2 is a flow chart showing the processing of a processor on an information processing apparatus which requests a loan of a processor.
Figure 3:
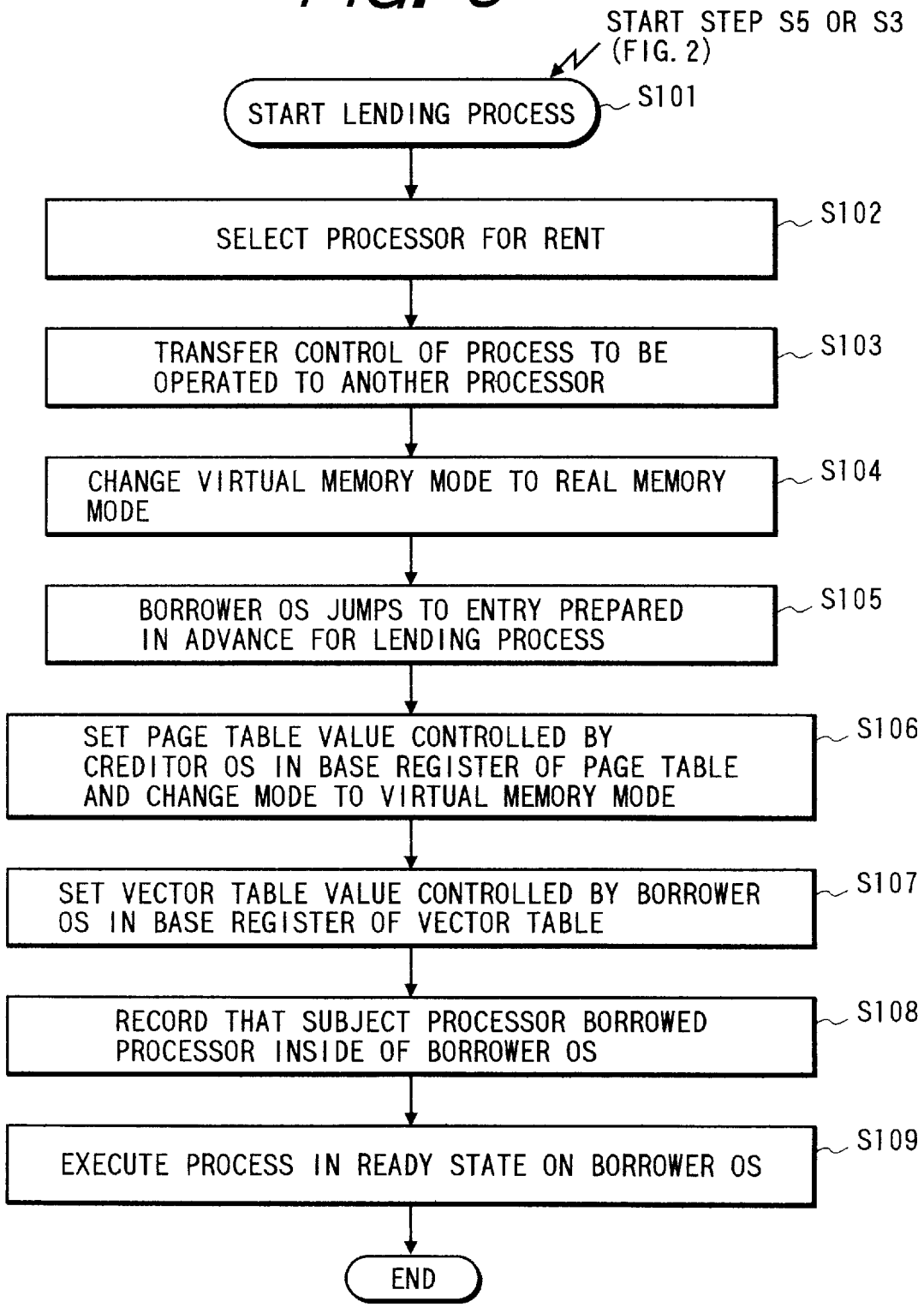
FIG. 3 is a flow chart showing the processing of a processor on an information processing apparatus which lends a processor.
Figure 4:
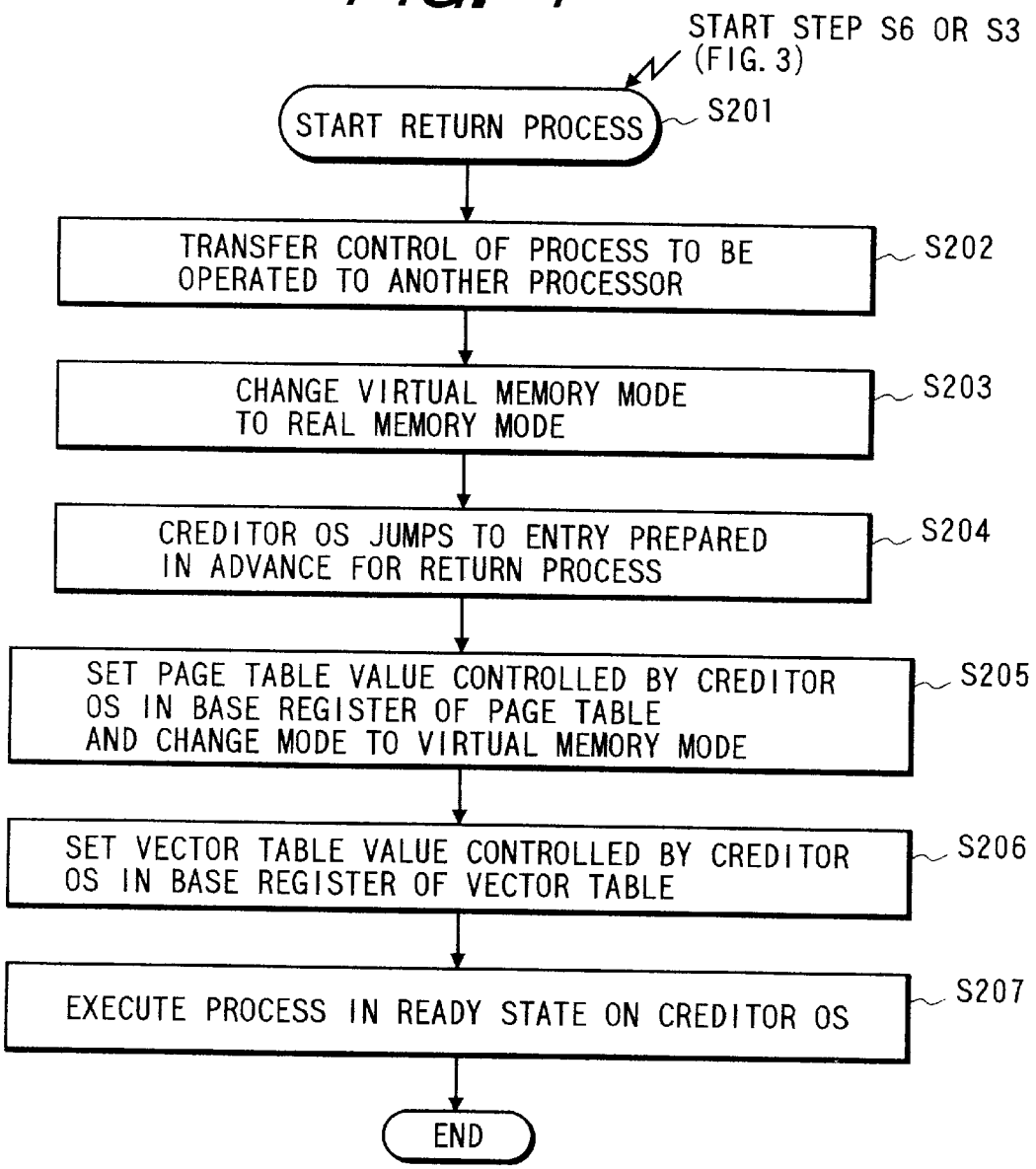
FIG. 4 is a flow chart showing the return processing of a lent processor.

FIGS. 2, 3, and 4 show the flows of processing operations according to the embodiment of the present invention. FIG. 2 shows the flow of the processing of the processor on the computer which requests a loan of a processor, FIG. 3 shows the flow of lending processing of a processor which is present on the lending-requested computer and serves as a processor for rent, and FIG. 4 shows the flow of processing executed when the lent processor is returned upon completion of the processing shown in FIG. 3.

Note that execution programs corresponding to these flow charts are programmed in the OSs 250, 350, and 450, and are executed by the CPUs of the respective computers.

A case will be exemplified below with reference to these flow charts wherein the processor 202 on the computer 201 requests a loan to the computer 301, and borrows the processor 303 on the computer 301.

In the system shown in FIG. 1, the OS 250 executed by the processor 202 controls only the processor (the processor 202) of the subject computer upon start of the OS, and assigns a process in a ready state to the processor using a scheduling method such as the time slice method, thus executing the process (step S1).

In step S2, the processor load detection unit (FIG. 5) in the OS 250 detects the load value of the processor under the control of the subject computer. It is checked in step S11 if the load value is high, low, or normal. The load value can be checked by calculating the ratio of the number of processes in a ready state to the number of processors. If this ratio exceeds a predetermined threshold value, for example, if the number of processes in the ready state exceeds a value four times the number of processors, a high-load state is determined. However, if the ratio is smaller than another threshold value, for example, if the number of processes in the ready state is equal to or smaller than the number of processors, a low-load state can be determined. On the other hand, if the ratio falls within a range between the two threshold values, a normal load state can be determined. If the number of processes in the ready state increases, the use ratio of the processor increases, and a high-load state is determined, the flow advances to step S3. If a normal load state is determined, the flow returns to step S2. If a low-load state is determined, processing to be described later is executed.

The load detection processing of the processor is periodically executed at intervals determined by experience (e.g., at 10-msec intervals).

In step S3, the other computer information collection unit (FIG. 5) of the OS 250 collects the processor load information of other computers connected via the communication line. The information collection can be realized by data interchange among the OSs utilizing the information interchange areas 260, 360, and 460, and the inter-computer interrupt lines 102, 103, and 104. Note that information may be corrected either from all the computers connected via the communication line or from some selected computers. The number of computers from which information is to be collected may be limited in consideration of the time required for collecting information from a single computer. Furthermore, computers serving as collection targets may be automatically selected by the computer randomly or by round robin scheduling, or may be set by a user in advance.

In step S4, the creditor computer selection unit (FIG. 5) of the OS 250 selects a computer from which a processor is to be borrowed. In this case, a computer which has a load value smaller than that of the subject computer and has the lowest load value is selected. Alternatively, a computer which has a load value twice or more lower than that of the subject computer may be selected. In this step, the number of processors to be borrowed is determined. Upon determination, for example, the maximum number of processors, with which the load value of the computer selected by the above-mentioned selection method does not exceed the load of the subject computer, is determined as the number of processors to be borrowed. For example, if the load value of the selected computer is 2 (e.g., the number of processes=8/the number of processors=4), and the load value of the subject computer is 8 (e.g., the number of processes=16/the number of processors=2), the number of processors to be borrowed is 2.

In the above-mentioned example, one computer is selected, and a plurality of processors are borrowed from the selected computer. Alternatively, a plurality of computers may be selected, and processors may be borrowed from these computers.

If no creditor computer is selected, i.e., if there is no computer having a load value lower than that of the subject computer, the threshold value for judging a high load in the processor load detection unit is set again to be slightly higher than the previous value (step S7), and the flow then returns to step S2. After the threshold value is set to be slightly higher, when the flow advances to step S3 again, it may be checked if the load values of other computers become lower than the previously checked values, and the threshold value may be restored to the original value. In this case, such checking processing can be easily realized by providing a mechanism of holding the previously collected load information of each computer to the other computer information collection unit.

A case will be exemplified below wherein the computer 301 is selected as a creditor computer in step S4, and it is determined that one processor is borrowed from the computer 301.

In step S5, the processor lending request unit (FIG. 5) of the OS 250 requests a loan of the determined number of processors (e.g., one processor) to the computer (e.g., the computer 301) selected by the creditor computer selection unit. In this case, the OS 250 on the subject computer issues a request to the OS (e.g., the OS 350) on the creditor computer. Such a request can also be realized by a communication between the OSs by utilizing the information interchange areas 260, 360, and 460, and the inter-computer interrupt lines 102, 103, and 104.

The processing of the creditor computer which received the lending request will be described below with reference to the flow chart shown in FIG. 3.

Referring to FIG. 3, the processor (in this case, it may be either of the processor 302 or 303; the processor 303 will be exemplified below) for executing the OS (in this case, the OS 350) on the creditor computer which received the request starts the processing for lending a requested number of processors by a processor lending unit in step S101. This lending processing is executed as follows.

In step S102, the processor 303 for executing the OS 350 which received the request selects a processor for rent. For example, if the multi-processor system has a symmetry arrangement and adopts a scheduling method of equally distributing loads on all the processors, the processor for rent may be randomly selected since it makes no difference if any of these processors is selected. Note that the symmetry system means that the processors possessed by a computer in question have the same arrangement.

Assume that the multi-processor system adopts a master-slave system. In this case, since a master processor cannot be lent, a processor for rent must be selected from slave processors.

A case will be exemplified below wherein, for example, the processor 303 is selected as a processor for rent.

In step S103, the control of a process which is being operated and a process which is scheduled to be operated in the processor 303 is transferred to another processor. In this case, since the processor itself which is executing this processing is a processor for rent, the processor 303 is currently executing the OS 350, and no process is being operated. However, if the processor 302 is selected as a processor for rent, the processor 302 may be executing a process. Thus, a method of transferring control of a process which is being operated and a process to be operated to another processor will be described below.

Normally, processes, which are in a ready state and waiting for a processor assignment for execution, are controlled to be queued in a so-called ready queue. In existing systems, as methods of controlling a ready queue, a method of preparing a plurality of queues in units of execution priority levels of processes (e.g., UNIX), a method of queuing processes in a single ready queue by sorting processes in the order of high execution priority, and the like are available. When the scheduling method is the time slice method, the processor switches processes to be executed when the time quantum of a process to which the processor is assigned and is being executed (called a running state) expires or when the process is set in an event waiting state (called a suspend state). That is, the processor returns the process which has been executed so far into a ready queue (when the time quantum expires), or queues the process in a suspend queue to set it in the event waiting state, fetches another process from the ready queue instead, and executes the fetched process by setting it in the running state. In this case, a process with higher priority is normally selected from the ready queue.

In the case of the multi-processor system, some methods of using the ready queue are available. In one method, the respective processors have their own ready queues, and each processor selects a process to be executed from its own ready queue. In another method, one ready queue which is shared by a plurality of processors is prepared for (if queues are provided in correspondence with priority levels, they are prepared in correspondence with the number of priority levels), and each processor selects a process to be executed from the shared ready queue.

When the respective processors have their own ready queues, transfer of a process is realized as follows. A source processor interrupts execution of a process which is being executed, and queues it in the ready queue of a destination processor. Thereafter, all processes queued in the ready queue of the source processor are removed from the queue, and are re-queued in the ready queue of the destination processor. When the ready queue is shared, transfer of a process is realized as follows. A source processor interrupts execution of a process which is being executed, and queues it in the shared ready queue.

Upon completion of transfer of all processes, when the processor 303 is set in an idle state, the migration processing of the control of the processor 303 is performed from the OS 350 to the OS 250.

The processor 303 is allowed to access the physical memory area controlled by the OS 250 in step S104 so as to execute program codes of the OS 250. In order to realize this, the processor 303 switches its own execution mode from the virtual memory mode to the real memory mode. With this processing, the processor 303 can access the memory area controlled by the OS 250 as the migration destination.

In step S105, the processor 303 jumps to an entry prepared in advance for lending processing of the processor by the OS 250.

Upon completion of the jump processing, the processor 303 which begins to execute the program codes of the OS 250 sets the value of a page table controlled by the OS 250 in a base register of a page table (not shown) in step S106 to change its execution mode to the virtual memory mode, thus allowing an operation in the virtual memory space of the OS 250.

In step S107, the processor 303 similarly sets a base register of an exception vector table (not shown) at the position of an exception vector table (not shown) controlled by the OS 250. In the case of a processor which cannot re-allocate the exception vector table by setting the base register, similar processing can be realized by rewriting the jump address of the table.

With the above-mentioned processing, the processor 303 is under the control of the OS 250. In step S108, data indicating that the processor is borrowed from the computer 301 is recorded inside the OS 250. In step S109, a process in a ready state on the OS 250 is assigned to the processor 303 in the same manner as the processor 202 under the control of the OS 250, and the processor 303 executes the assigned process. In this manner, the processor lending processing ends.

In this manner, the operation is continued by borrowing a processor from another computer to reduce the load of the subject computer. At times, some processes in operation may end soon, and the load of the subject computer may be reduced. More specifically, if the processor load detection unit determines in step S2 that the load value is lower than a predetermined threshold value, i.e., the unit determines a low-load state, the flow advances to step S6. In this case, it is checked if the load value is smaller than 1 (the number of processors is the same as the number of processes in a ready state).

After the processor 303 is borrowed like in this embodiment, the processing shown in FIG. 2 is executed by either the processor 202 or 303. In this embodiment, the processor 202 executes the processing shown in FIG. 2. If the processor 303 executes the processing shown in FIG. 2 and the flow advances to steps S1, S2, and S6, the control then advances to step S201 in FIG. 4 to start the processor return processing. In this embodiment, the processor 202 executes steps S1, S2, and S6, and issues a request to the processor 303 to control it to start the return processing (step S201). This request may be realized by interrupt means or polling means utilizing the processing switching timing of the processor 303.

In step S201, the processor return unit returns the subject processor (the processor 303) to the creditor computer. The processor return processing can be realized by processing similar to the processor lending processing. In step S202, the control of all processes to be executed by the processor 303 is transferred to another processor. Upon completion of the transfer of the control of all the processes, when the processor 303 is set in an idle state, the execution mode is switched from the virtual memory mode to the real memory mode in step S203 to execute migration processing of the control of the processor 303 from the OS 250 to the OS 350. In step S204, the processor 303 jumps to an entry prepared in advance for the processor return processing by the OS 350. Upon completion of the jump processing, the processor 303, which begins to execute program codes of the OS 350, sets the value of a page table controlled by the OS 350 in the base register of the page table in step S205 to switch the execution mode to the virtual memory mode, thus allowing an operation in the virtual memory space of the OS 350. Similarly, the processor 303 sets the base register of the exception vector table at the position of an exception vector table controlled by the OS 350 in step S206.

With the above processing, the processor 303 returns to the control of the OS 350. In step S207, a process in a ready state on the OS 350 is assigned to the processor 303 in the same manner as processing before the lending processing, and the processor 303 executes the assigned process. In this manner, the processor return processing ends.

As described above, according to this embodiment, the load state of a processor controlled by the subject computer is detected. If a high-load state is detected, the load states of other computers connected via the communication line are checked to select a computer in a low-load state and to determine the number of processors to be borrowed. Then, processors corresponding to the determined number of processors are migrated from the control of the creditor computer to the control of the borrower computer.

As described above, an information processing apparatus, which can effectively utilize processors on other computers connected via the communication line with a minimum overhead without suffering any limitations upon generation, execution, and control of processes, can be provided.

A case will be exemplified below wherein a processor of another computer is migrated to the control of the subject computer as needed while securing physical pages from other computers.

In the system shown in FIG. 1, when a user program is started as a process, and the process begins to run on, e.g., the processor 202 on the computer 201, the virtual memory control mechanism of the OS 250 assigns a physical memory as pages in an on-demand manner, and required contents (data or text) are loaded from, e.g., the secondary memory device.

At this time, the OS 250 attempts to assign pages from the physical memory 230 (which allows the processor 202 to make a high-speed access). If the number of free pages on the physical memory 230 is insufficient, the OS 250 assigns pages from the physical memories 330 and 430 (such pages will be referred to as remote pages for the process). In this case, the OS 250 acquires memory scheduling information from computers other than the subject computer 201 to detect the number of free pages, the load states of the processors, and the like of the respective computers. Such acquisition of memory scheduling information by the OS can be realized in such a manner that each OS reflects its information at the predetermined location of the information interchange area 260, 360, or 460, and reads out the information therefrom if required.

Based on the above information, the OS 250 determines a physical memory from which pages are to be secured. Upon determination of pages to be assigned, physical pages on the computer with a large number of free pages and a low processor load are used.

However, for example, when the computer 301 has a small number of free pages but a low processor load, and the computer 401 has a large number of free pages but a high processor load, the physical memory is determined on the basis of an evaluation function which is determined by experience using the number of pages and the load. Since physical pages are required in an initial stage, control is made to have priority on the number of free pages over the load state of the processor, and pages are acquired from the physical memory 430 of the computer 401.

If it is determined upon determination of pages to be assigned that pages are secured from, e.g., the physical memory 430, the OS 250 secures and assigns remote pages from the physical memory 430, and loads the required contents (data or text) from the secondary memory device into the assigned pages as in normal pages, thus proceeding with execution of the process.

In this embodiment, remote pages can be secured by the cooperation of the OSs 250 and 450.

In this case, the OS 250 writes information in the information interchange area 260 or 460 to inform the OS 450 of information indicating that physical pages are required from the physical memory 430, asynchronously calls the OS 450 using the inter-CPU interrupt line 102, and waits until a result returns.

During the waiting processing, a processor may be assigned to another process.

On the other hand, the called OS 450 secures physical pages from the physical memory 430 in accordance with information from the OS 250, and sets the internal state of the physical pages so that they are under the control of the OS 250. Then, the OS 450 writes information (e.g., physical addresses) associated with the secured physical pages in the information interchange area 260 or 460, asynchronously calls the OS 250 using the inter-CPU interrupt line 102, and transfers the physical pages.

The interrupted OS 250 is released from the waiting state, and assigns the secured remote pages to execution of the process.

Figure 6:
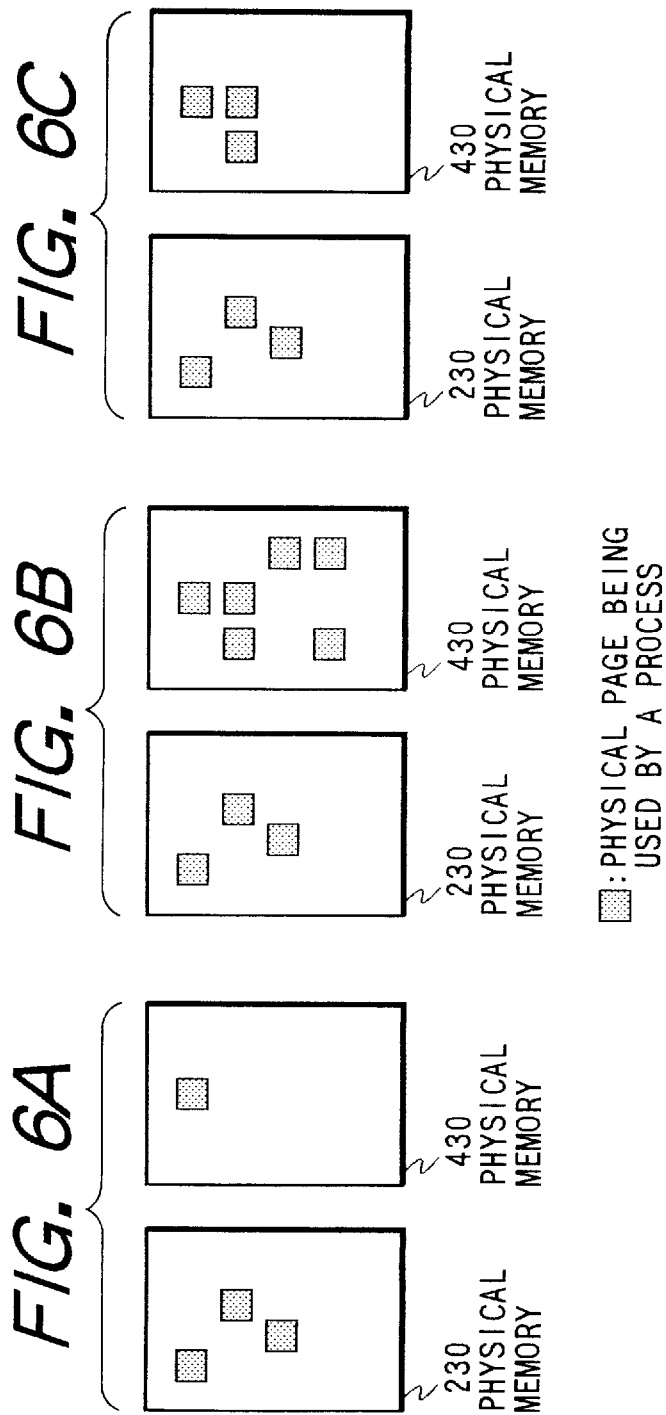
FIGS. 6A to 6C are views for explaining the physical page allocation states on a physical memory.

When the process runs while securing pages, the physical page allocation states of the physical memories transit, as shown in FIGS. 6A to 6C.

The physical page allocation states of the physical memories in the computer system of this embodiment will be explained below with reference to FIGS. 6A to 6C.

FIGS. 6A to 6C are views for explaining the physical page allocation states of the physical memories in the computer system according to this embodiment, and the same reference numerals in FIGS. 6A to 6C denote the same parts as in FIG. 1.

As described above, when the process runs while securing pages, the physical page allocation states of the physical memories 230 and 430 change from the states shown in FIG. 6A to the states shown in FIG. 6B or 6C.

In particular, as shown in FIG. 6B, when the ratio of physical pages secured on the physical memory 430 is higher than that on the physical memory 230, and the loads on the processors 402 and 403 of the computer 401 are low, it is more efficient to transfer the control of the processor 402 or 403 from the OS 450 to the OS 250 to execute a process than to proceed with execution of the process using the processor 202.

Also, the same applies to a case wherein the physical memories have substantially the same ratio of physical pages, but the load on the processor 202 becomes higher than those on the processors 402 and 403, as shown in FIG. 6C.

Thus, the OS 250 judges the above-mentioned situation. More specifically, the OS 250 checks based on the page allocation information of a target process and the processor load information of the acquired memory scheduling information if the subject computer is in the situation shown in FIG. 6B or 6C, i.e., in the situation that requires migration of a processor. The processor migration decision processing is started at the on-demand timing of page securing and at the timing of a change in load on the processor (a change in the number of processes in a ready state) upon process scheduling or upon generation/deletion of a process.

When migration of a processor and a source computer are determined in the processor migration decision processing, migration assignment of the processor is performed. For example, when the computer 401 is a source computer, the control of the processor 402 or 403 is migrated from the OS 450 to the OS 250, and the migrated processor is assigned to execute a process.

Migration and assignment of the processor are executed as follows. A case will be exemplified below wherein the processor is migrated from the OS 450 to the OS 250, and is assigned to a process under the control of the OS 250.

The OS 250 issues a migration request of the processor to the OS 450. This processing is executed by writing the request contents in the information interchange area 260 or 460 and asynchronously calling the OS 450 using the inter-CPU interrupt line 102.

The OS 450, which received the processor migration request, selects a processor to be migrated. At this time, in a symmetry system, the processor to be migrated may be randomly selected, or in a master-slave system, a slave processor with the lowest load may be selected. For example, if the processor 403 is selected, a process which is operating and processes which are scheduled to be operated on the processor 403 are transferred to the processor 402.

Upon completion of the transfer of all the processes, when the processor is set in an idle state, the execution mode of the processor is switched from the virtual memory mode to the real memory mode to allow jump processing to the memory area controlled by the OS 250 as a migration destination. Finally, the processor 402 jumps to an entry prepared in advance by the OS 250. Thus, the processor 402 is under the control of the OS 250.

The processor 402 jumped to the designated entry sets the value of a page table controlled by the OS 250 in the base register of the page table to switch its execution mode to the virtual memory mode, thus allowing an operation in the virtual memory space of the OS 250. Also, the processor 402 sets the base register of the exception vector table at the position of an exception vector table controlled by the OS 250. In the case of a processor which cannot re-allocate the exception vector table by setting the base register, similar processing can be realized by rewriting the jump address of the table. With the above processing, the processor 402 is under the control of the OS 250.

The processor 402 is then assigned to designated processes. A ready queue for controlling processes to be executed by the processor 402 is prepared. The ready queue may be generated upon start of the OS 250 and may be assigned upon migration of the processor 402, or may be generated upon migration of the processor 402. The processes are queued in the ready queue to be executed by the processor 402.

When the process is being executed by the processor 202 prior to this processing, the running state of the process is canceled. On the other hand, when the process is in an execution waiting state by the processor 202 prior to this processing, the process is removed from the ready queue for the processor 202. Finally, the processor 402 executes the process queued in its own ready queue by setting it in the running state. If there is only one process, the processor 402 executes the process; if there are a plurality of processes, the processor 402 executes the processes in turn using, e.g., the time slice method.

In this manner, a computer system, in which the plurality of computers 201, 301, and 401 are connected via the high-speed communication line 101, the physical memories (or their portions) 230, 330, and 430 arranged in the respective computers constitute a single memory space as a whole, and the entire system can operate in the form of an NUMA type multi-processor system (in the form that although an access to a memory arranged in a subject computer is made at high speed and an access to memories arranged in other computers is made at low speed when viewed from a given computer, since these memories form a single memory space as a whole, the computers can also be used as a multi-processor system) can be constituted. When a process is generated and started and physical pages are to be secured at on-demand timings, if no more pages can be secured on the computer on which the process runs, a computer from which physical pages are to be secured is determined on the basis of the acquired memory scheduling information.

During the operation of the process while securing remote pages, the processor migration decision processing checks which is more efficient to proceed with execution of the process by the current processor or to migrate the control of the processor of another computer and to execute the process by the migrated processor. If it is determined that it is efficient to migrate the control of the processor of another computer and to execute the process by the migrated processor, the processor migration assignment processing migrates the control of the processor of a computer which is determined to improve efficiency, and assigns the processor to execute the process. In this manner, the process execution efficiency can be improved without suffering any limitations upon execution of the process.

Figure 7:
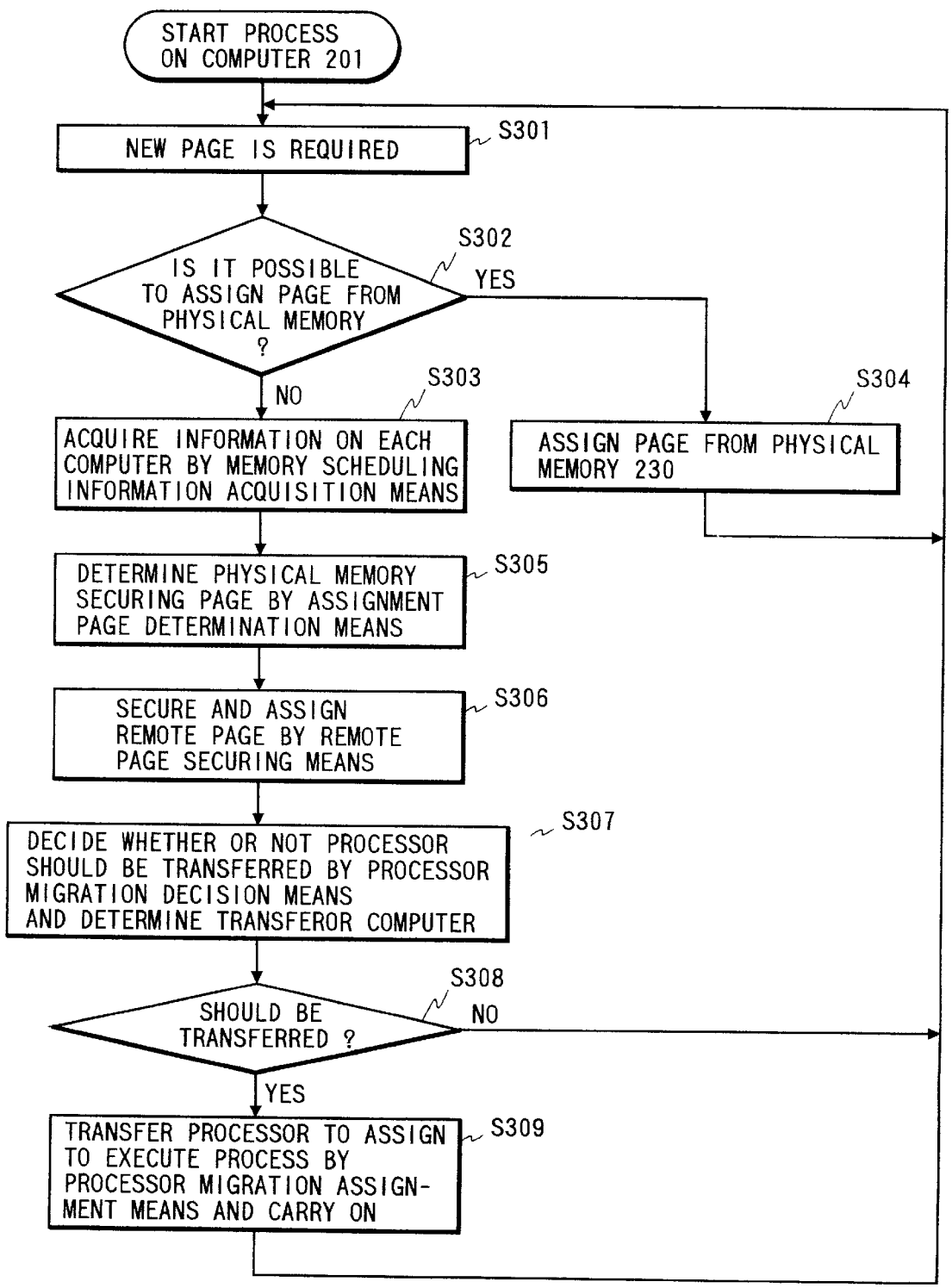
FIG. 7 is a flow chart showing an example of the memory resource control processing sequence.

FIG. 7 is a flow chart showing the memory resource control processing sequence in the computer system of this embodiment. A case will be exemplified below wherein a process is started on the computer 201.

When the process is started on the computer 201, a new page is required (step S301). It is checked if a page can be assigned from the physical memory 230 (step S302). If YES in step S302, a page is assigned from the physical memory 230 (step S304), and the flow returns to step S301.

On the other hand, if it is determined in step S302 that a page cannot be assigned, memory scheduling information acquisition means acquires information of the respective computers (step S303). Then, assignment page determination means determines a physical memory from which a page is to be secured (step S305). Remote page securing means secures and assigns a remote page (step S306). Thereafter, processor migration decision means decides if a processor migrated from another computer is to be assigned, and determines the transferor computer (step S307). It is checked if a processor is to be transferred (step S308). If NO in step S308, the flow returns to step S301; otherwise, processor migration assignment means transfers the processor from the transferor computer and assigns it to execute the process (step S309). Thereafter, the flow returns to step S301.

In this embodiment, securing of remote pages and migration and assignment of a processor are realized by utilizing the inter-CPU interrupt line 102. However, the same effect can be expected by executing the above-mentioned processing using a polling mechanism by sensing a flag without using the inter-CPU interrupt line 102.

For example, in the situation described in the above embodiment, securing of remote pages is realized by the cooperation of the OSs 250 and 450, and an asynchronous communication at that time utilizes the inter-CPU interrupt line 102.

In this embodiment, this processing is executed by the following alternative method. The OS on the side of generating an interrupt turns on a flag in a flag area allocated on the information interchange area 260 or 460 in place of generating an inter-CPU interrupt.

On the other hand, the OS on the side of receiving the inter-CPU interrupt operates a routine for sensing if the flag is ON in the form of, e.g., a daemon process. When it is sensed that the flag is ON, the OS executes the same processing as that executed upon reception of the inter-CPU interrupt.

In this case, since the OS 250 or 450 cannot always sense the flag, the routine (daemon process) for sensing the flag is programmed to periodically sense the flag at a predetermined interval (e.g., about 10 msec).

In the above embodiment, the processor migration decision processing is started at the on-demand timing of page securing and at the timing of a change in load on the processor. Alternatively, the processor migration decision processing may be realized as follows.

More specifically, the processor migration decision processing and the processor migration assignment processing may be realized in the form of a daemon process in the OS to asynchronously perform decision and migration. In this case, in order to prevent the daemon process from disturbing execution of other processes, low priority is preferably set for this daemon process.

The daemon process runs on the OS of each computer, and performs decision for all the processes controlled by each OS. Alternatively, the daemon process may perform decision for processes controlled by the OS other than the subject OS. This processing is effective in the following case.

For example, when the load on one computer is large, and hence, a daemon process (processor migration decision means) with low priority cannot easily run, a daemon process which runs on other computer can perform decision in place of the former daemon process.

As described above, when a process is generated and started and secures physical pages, if no more pages can be secured on an information processing apparatus on which the process runs, an information processing apparatus from which physical pages to be assigned to the process to be executed are to be secured is determined on the basis of physical memory control information and process execution scheduling information, and remote pages are secured from the physical memory of the determined information processing apparatus. Upon proceeding with execution of the process, it is checked if the processor of another information processing apparatus is transferred to the control of the subject apparatus and is assigned to the process. If it is determined that the process is to be executed by the transferred processor, the control of the processor is transferred from the transferor information processing apparatus, and is assigned to execute the process. Therefore, the process execution efficiency can be improved without suffering any limitations upon execution of the process. During execution of the process in one information processing apparatus, the process execution can be entrusted to another information processing apparatus and can be parallelly executed with other processing, thus improving the process execution efficiency of the entire system.

The present invention described above may be applied to either a system constituted by a plurality of computers or a specific computer in a system. The present invention may also be applied to a case wherein the invention is attained by executing a program by the computer. The program may be supplied from an external storage medium, and the storage medium for storing this program is included in the scope of this invention.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. An information processing system comprising a plurality of information processing apparatuses each having one or more processors, wherein said plurality of information processing apparatuses are connected via a high-speed communication line, memories arranged in the respective information processing apparatuses constitute a single memory space as a whole, and the system can operate in the form of an NUMA type multiprocessor system, and wherein each given information processing apparatus of the plurality of information processing apparatuses comprises:

at least one processor;

processor load state detection means for detecting a processing load state of said at least one processor;

determination means for determining on the basis of the detected processing load state if a processor is to be borrowed from another information processing apparatus;

other processor load state acquisition means for acquiring a processing load state of a processor of another information processing apparatus;

information processing apparatus selection means for, when said determination means determines that the processor is to be borrowed from another information processing apparatus, selecting a lending information processing apparatus from which the processor is to be borrowed, on the basis of the processing load state acquired by said other processor load state acquisition means;

processor lending request means for sending a request for a loan of a processor to the lending information processing apparatus;

processor-for-rent selection means for selecting a processor for rent from the given information processing apparatus on the basis of a processor lending request received from a borrowing information processing apparatus;

process assignment means for assigning a current process, from among processes scheduled to be executed by the processor for rent, to other processors of the given information processing apparatus;

processor lending means for migrating the control of the processor for rent to the borrowing information processing apparatus; and processor reception and assignment means for receiving the control of a rented processor to be executed under control of the borrowing information processing apparatus, and for causing the rented processor to assign and execute a current process scheduled to be executed under control of the borrowing information processing apparatus.

2. An apparatus according to claim 1, wherein said determination means determines that the processor is to be borrowed from the other information processing apparatus when a value of the processing load state detected by said processor load state detection means is higher than a predetermined value.

3. An apparatus according to claim 1, wherein said processor load state detection means detects a value of the processing load state on the basis of the number of processors and the number of processes in a ready state.

4. An apparatus according to claim 1, wherein said information processing apparatus selection means selects the other information processing apparatus which has a lowest value of the processing load state acquired by said other processor load state acquisition means.

5. An apparatus according to claim 1, further comprising:

second determination means for determining if there is a processor borrowed from another information processing apparatus to the subject apparatus; and return means for, when said second determination means determines that there is a borrowed processor, and a value of the processing load state detected by said processor load state detection means is lower than a second predetermined value, returning the borrowed processor to the creditor information processing apparatus.

6. An information processing method for an information processing system having a plurality of information processing apparatuses, each given information processing apparatus of the plurality of information processing apparatuses having at least one processor, wherein said plurality of information processing apparatuses are connected via a high-speed communication line, memories arranged in the respective information processing apparatuses constitute a single memory space as a whole, and the system can operate in the form of an NUMA type multiprocessor system, the method comprising:

the processor load state detection step of detecting a processing load state of said at least one processor of the given information processing apparatus;

the determination step of determining on the basis of the detected processing load state if a processor is to be borrowed from another information processing apparatus;

the other processor load state acquisition step of acquiring a processing load state of a processor of another information processing apparatus;

the information processing apparatus selection step of selecting a lending information processing apparatus from which the processor is to be borrowed, on the basis of the processing load state acquired in the other processor load state acquisition step when it is determined in the determination step that the processor is to be borrowed;

the processor lending request step of sending a request for a loan of the processor to the lending information processing apparatus;

the processor-for-rent selection step for selecting a processor for rent from the given information processing apparatus on the basis of a processor lending request received from a borrowing information processing apparatus;

the process assignment step for assigning a current process, from among processes scheduled to be executed by the processor for rent, to other processors of the given information processing apparatus;

the processor lending step for migrating the control of the processor for rent to the borrowing information processing apparatus; and the processor reception and assignment step for receiving the control of a rented processor to be executed under control of the borrowing information processing apparatus, and for causing the rented processor to assign and execute a current process scheduled to be executed under control of the borrowing information processing apparatus.

7. A method according to claim 6, wherein it is determined in the determination step that the processor is to be borrowed from the other information processing apparatus when a value of the processing load state detected in the processor load state detection step is higher than a predetermined value.

8. A method according to claim 6, wherein the processor load state detection step includes the step of detecting a value of the processing load state on the basis of the number of processors and the number of processes in a ready state.

9. A method according to claim 6, wherein the information processing apparatus selection step includes the step of selecting the other information processing apparatus which has a lowest value of the processing load state acquired in the other processor load state acquisition step.

10. A method according to claim 6, further comprising:

the second determination step of determining if there is a processor borrowed from another information processing apparatus to the subject apparatus; and the return step of returning the borrowed processor to control of the creditor information processing apparatus when it is determined in the second determination step that there is a borrowed processor, and a value of the processing load state detected in the processor load state detection step is lower than a second predetermined value.

11. A method according to claim 6, wherein the information processing apparatus selection step includes the step of selecting one of information processing apparatuses in each of which a value of the processing load state acquired in the other processor load state acquisition step is lower than a second predetermined value, when a value of the processing load state detected in the processor load state detection step is higher than a first predetermined value.

12. An information processing system comprising a given information processing apparatus connected to at least one other information processing apparatus having an independent memory via a high speed communication line, wherein each information processing apparatus has one or more processors, memories arranged in the respective information processing apparatuses constitute a single memory space as a whole, and the system can operate in the form of an NUMA type multi-processor system, and wherein each information processing apparatus comprises:

information acquisition means for acquiring control information of a physical memory and scheduling information of process execution of the other information processing apparatus;

assignment page determination means for determining an information processing apparatus from a physical memory of which a physical page to be assigned to a process to be executed is secured, on the basis of the information acquired by said information acquisition means;

remote page securing means for securing a remote page from the information processing apparatus determined by said assignment page determination means and having the physical page;

processor migration decision means for determining if control of a processor of the other information processing apparatus is to be transferred to control of the subject apparatus and the processor is assigned to the process to be executed upon proceeding with execution of the process by migrating control of the processor; and processor migration assignment means for, when said processor migration decision means determines that the process is to be executed by the transferred processor, transferring the control of the processor from the transferor information processing apparatus and assigning the processor to execute the process.

13. An apparatus according to claim 12, wherein said assignment page determination means determines to secure a physical page from a physical memory of an information processing apparatus having a physical memory with a large number of free pages.

14. An apparatus according to claim 12, wherein said assignment page determination means determines to secure a physical page from a physical memory of an information processing apparatus with a low processor load.

15. An information processing method for an information processing apparatus which is connected to at least one other information processing apparatus having an independent memory via a high speed communication line to form an information processing system, wherein each information processing apparatus of the system has one or more processors, memories arranged in the respective information processing apparatuses constitute a single memory space as a whole, and the system can operate in the form of an NUMA type multi-processor system, the method comprising:

the information acquisition step of acquiring control information of a physical memory and scheduling information of process execution of the other information processing apparatus;

the assignment page determination step of determining an information processing apparatus from a physical memory of which a physical page to be assigned to a process to be executed is secured, on the basis of the information acquired in the information acquisition step;

the remote page securing step of securing a remote page from the information processing apparatus determined in the assignment page determination step and having the physical page;

the processor migration decision step of determining if control of a processor of the other information processing apparatus is to be transferred to control of the subject apparatus and the processor is assigned to the process to be executed upon proceeding with execution of the process by migrating control of the processor; and the processor migration assignment step of transferring the control of the processor from the transferor information processing apparatus and assigning the processor to execute the process when it is determined in the processor migration decision step that the process is to be executed by the transferred processor.

16. A method according to claim 15, wherein the assignment page determination step includes the step of determining to secure a physical page from a physical memory of an information processing apparatus having a physical memory with a large number of free pages.

17. A method according to claim 15, wherein the assignment page determination step includes the step of determining to secure a physical page from a physical memory of an information processing apparatus with a low processor load.

* * * * *